US010001397B2

(12) United States Patent
Matsuda et al.

(10) Patent No.: US 10,001,397 B2
(45) Date of Patent: Jun. 19, 2018

(54) PHYSICAL QUANTITY MEASURING DEVICE

(71) Applicant: NAGANO KEIKI CO., LTD., Tokyo (JP)

(72) Inventors: Takahiro Matsuda, Tokyo (JP); Jinichi Todoroki, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 0 days. days.

(21) Appl. No.: 15/610,090

(22) Filed: May 31, 2017

(65) Prior Publication Data
US 2017/0350743 A1    Dec. 7, 2017

(30) Foreign Application Priority Data

Jun. 2, 2016    (JP) .................................. 2016-111226

(51) Int. Cl.
G01F 23/18    (2006.01)
G01L 19/14    (2006.01)

(52) U.S. Cl.
CPC .................................... *G01F 23/18* (2013.01)

(58) Field of Classification Search
CPC ........... G01F 23/18; G01F 23/00; G01L 19/14
USPC .......................................................... 73/431
See application file for complete search history.

(56) References Cited

U.S. PATENT DOCUMENTS

| 5,895,861 | A * | 4/1999 | Slonaker | G01K 5/38 374/143 |
| 7,720,555 | B2 * | 5/2010 | Staiger | G02F 1/133382 219/414 |
| 8,112,897 | B2 * | 2/2012 | Valoff | G01D 4/008 116/304 |
| 8,336,408 | B2 * | 12/2012 | Hershey | G01D 7/00 29/593 |
| 8,353,211 | B2 * | 1/2013 | Vinshtok | G01D 11/245 73/431 |
| 8,468,893 | B2 * | 6/2013 | Fujiwara | G01L 19/16 73/700 |
| 8,929,948 | B2 * | 1/2015 | Vanderaa | G01D 11/245 439/709 |
| 9,030,190 | B2 * | 5/2015 | Matt | G01D 11/24 324/156 |

(Continued)

FOREIGN PATENT DOCUMENTS

DE    102013220091 A1    4/2015
JP    2006-012746        1/2006

(Continued)

OTHER PUBLICATIONS

European Search Report dated Oct. 17, 2017, 5 pages.

*Primary Examiner* — Harshad R Patel
*Assistant Examiner* — Jamel Williams
(74) *Attorney, Agent, or Firm* — Rankin, Hill & Clark LLP

(57) ABSTRACT

A device includes: an outer case; an inner case; a cylindrical base having a distal end that penetrates through a cylinder of the outer case to be fixed to the outer case; and a fastener configured to be mounted on the distal end of the base, the fastener including: an exterior configured to be guided by a guide provided to the inner case; a fastener-side engaging portion engageable with the inner case; and a contact peripheral portion configured to be contact with the outer case to prevent the inner case from rotating relative to the outer case.

6 Claims, 7 Drawing Sheets

(56) References Cited

U.S. PATENT DOCUMENTS

| | | | | |
|---|---|---|---|---|
| 9,634,858 | B2* | 4/2017 | Reller | H04L 12/40045 |
| 2007/0201192 | A1* | 8/2007 | McGuire | G01L 19/14 |
| | | | | 361/600 |
| 2008/0006094 | A1* | 1/2008 | Schulte | G01F 1/34 |
| | | | | 73/736 |
| 2011/0058313 | A1 | 3/2011 | Hausler et al. | |
| 2011/0273854 | A1* | 11/2011 | Wagner | G01D 11/245 |
| | | | | 361/752 |
| 2015/0065969 | A1* | 3/2015 | Stinson | A61M 1/0031 |
| | | | | 604/320 |
| 2015/0276537 | A1 | 10/2015 | Toba et al. | |
| 2015/0354998 | A1* | 12/2015 | Hausler | G01D 11/30 |
| | | | | 73/866.5 |
| 2017/0153157 | A1* | 6/2017 | Abe | G01L 9/0041 |

FOREIGN PATENT DOCUMENTS

| | | | | |
|---|---|---|---|---|
| JP | 5716028 | | 5/2015 | |
| JP | WO 2016088756 A1 * | | 6/2016 | G01L 19/14 |
| WO | WO 2007051779 A1 * | | 5/2007 | G01L 19/003 |

* cited by examiner

PHYSICAL QUANTITY MEASURING DEVICE

The entire disclosure of Japanese Patent Application No. 2016-111226 filed Jun. 2, 2016 is expressly incorporated by reference herein.

TECHNICAL FIELD

The present invention relates to a physical quantity measuring device.

BACKGROUND ART

Some physical quantity measuring devices include an inner case for housing a battery or the like, an outer case for housing the inner case, and a base fixed to the outer case. For such physical quantity measuring devices, the inner case should desirably be fixed to the outer case. For instance, when a battery is housed in the inner case, a circumferential rotation of the inner case relative to the outer case can cause an accidental breakage of a wire connecting the battery to a detector outside the inner case. The inner case thus needs to be fixed to the outer case.

A typical example of the physical quantity measuring devices including the inner and outer cases is a transmitter including a stainless cylindrical outer plate, an aluminum chassis housed in the outer plate, and a neck attached to the outer plate and the chassis (Patent Literature 1: JP 5716028 B2).

In the typical example of Patent Literature 1, the neck is welded to the outer plate and screwed to the chassis.

In another typical example, a fixture is pressed inward to bring an elastic lock piece into engagement, thereby movably fixing an optical unit in a case (Patent Literature 2: JP 2006-012746 A).

In the typical example of Patent Literature 1, the outer plate, the chassis and the neck of which respectively correspond to the outer case, the inner case and the base, the inner case is fixed to the outer case by welding the neck to the outer plate and screwing the neck to the chassis. Such a structure for fixing the inner case to the outer case is complicated.

In the typical example of Patent Literature 2, the structure for fixing the optical unit to the case is merely disclosed, but preventing the rotation of the inner case relative to the outer case is not taken into consideration.

SUMMARY OF THE INVENTION

An object of the invention is to provide a physical quantity measuring device with a simple structure capable of preventing the rotation of an inner case relative to an outer case.

According to an aspect of the invention, a physical quantity measuring device includes: an outer case including a cylinder; a cylindrical inner case housed in the outer case; a cylindrical base having a distal end that penetrates through a circumferential surface of the cylinder of the outer case to be fixed to the outer case; and a fastener configured to be mounted on the distal end of the base to prevent detachment of the inner case from the outer case, the fastener including: an exterior configured to be guided by a guide provided to the inner case; a fastener-side engaging portion engageable with the inner case; and a contact peripheral portion configured to be contact with the outer case to prevent the inner case from rotating relative to the outer case.

According to the aspect of the invention, the outer case is fixed to the base with the distal end of the base being penetrated through the circumferential surface of the outer case. The fastener is then mounted onto the distal end of the base penetrated through the outer case. Additionally, the contact peripheral portion of the fastener is kept in contact with the outer case.

Further, the inner case is pressed against the fastener with the exterior of the fastener being guided by the guide. The fastener-side engaging portion of the fastener is then engaged with the inner case, and the outer case and the inner case are fixed to each other via the fastener. In such a state, the contact peripheral portion of the fastener, which is in contact with the outer case, can prevent the inner case from rotating relative to the outer case even during transportation of the physical quantity measuring device or in any other situations that may cause the rotation of the inner case relative to the outer case.

According to the aspect of the invention, fixation of the inner case to the outer case and prevention of the rotation of the inner case relative to the outer case can thus be achieved simply by mounting the fastener on the base and pressing the inner case against the fastener.

It should be noted that the fastener according to the aspect of the invention is intended to prevent detachment of the inner case from the outer case, and 'preventing detachment' may include preventing removal and preventing projection.

In the above aspect, it is preferable that the fastener further includes a fitting groove in which the distal end of the base is to be fitted.

In the above arrangement, the fastener is mounted on the base with the fitting groove being fitted with the distal end of the base, thereby easily positioning the fastener relative to the base. Further, the fastener, the fitting groove of which is fitted with the distal end of the base, is unlikely to be detached from the base. This allows for prevention of the rotation of the inner case relative to the outer case resulting from an accidental detachment of the fastener from the base.

In the above aspect, the outer case is made of metal and the inner case and the fastener are each made of a synthetic resin.

The above arrangement allows the inner case and the fastener, which are each made of a synthetic resin, to be easily manufactured by injection molding or any other technique. Further, the inner case, which is made of a synthetic resin, can be easily provided with a relatively large hollow space such as a battery housing space. In addition, since the outer case is made of metal, the physical quantity measuring device is easy to clean and thus sanitarily favorable.

In the above aspect, it is preferable that the outer case includes a bottom provided to the cylinder, the contact peripheral portion is brought into contact with the bottom of the outer case, and the fastener-side engaging portion is placed opposite the contact peripheral portion.

In the above arrangement, the fastener is mounted on the distal end of the base with the contact peripheral portion being in contact with the bottom of the outer case, and the inner case is pressed against the fastener-side engaging portion of the fastener opposite the contact peripheral portion thereof. Such components as the contact peripheral portion and the fastener-side engaging portion of the fastener, which are opposite each other, further simplify a structure for preventing the rotation of the inner case relative to the outer case.

In the above aspect, it is preferable that a sensor is provided to the base, a display is attached inside the outer case, a cable that connects the display to the sensor is placed through the base and the outer case, and the fastener is provided with a hole configured to receive therein the cable.

In the above arrangement, a physical quantity detected by the sensor provided to the base is transmitted in the form of a signal through the cable and displayed at the display attached to the outer case. Although the cable has to extend through the base, the outer case and the inner case, the hole provided to the fastener for receiving therein the cable facilitates assembly of the physical quantity measuring device.

In the above aspect, it is preferable that the fastener-side engaging portion includes a claw engageable with an engagement hole provided to the inner case, the claw having a distal end provided with a hook for preventing detachment.

The above arrangement allows the claw of the fastener-side engaging portion to be reliably engaged with the engagement hole of the inner case, which results in preventing detachment of the fastener from the inner case. Further, such a simple engagement of the fastener with the inner case serves to prevent disassembly of a major part of the physical quantity measuring device.

DESCRIPTION OF EMBODIMENT(S)

A physical quantity measuring device according to an exemplary embodiment of the invention will be described below with reference to the attached drawings.

Figure 1:
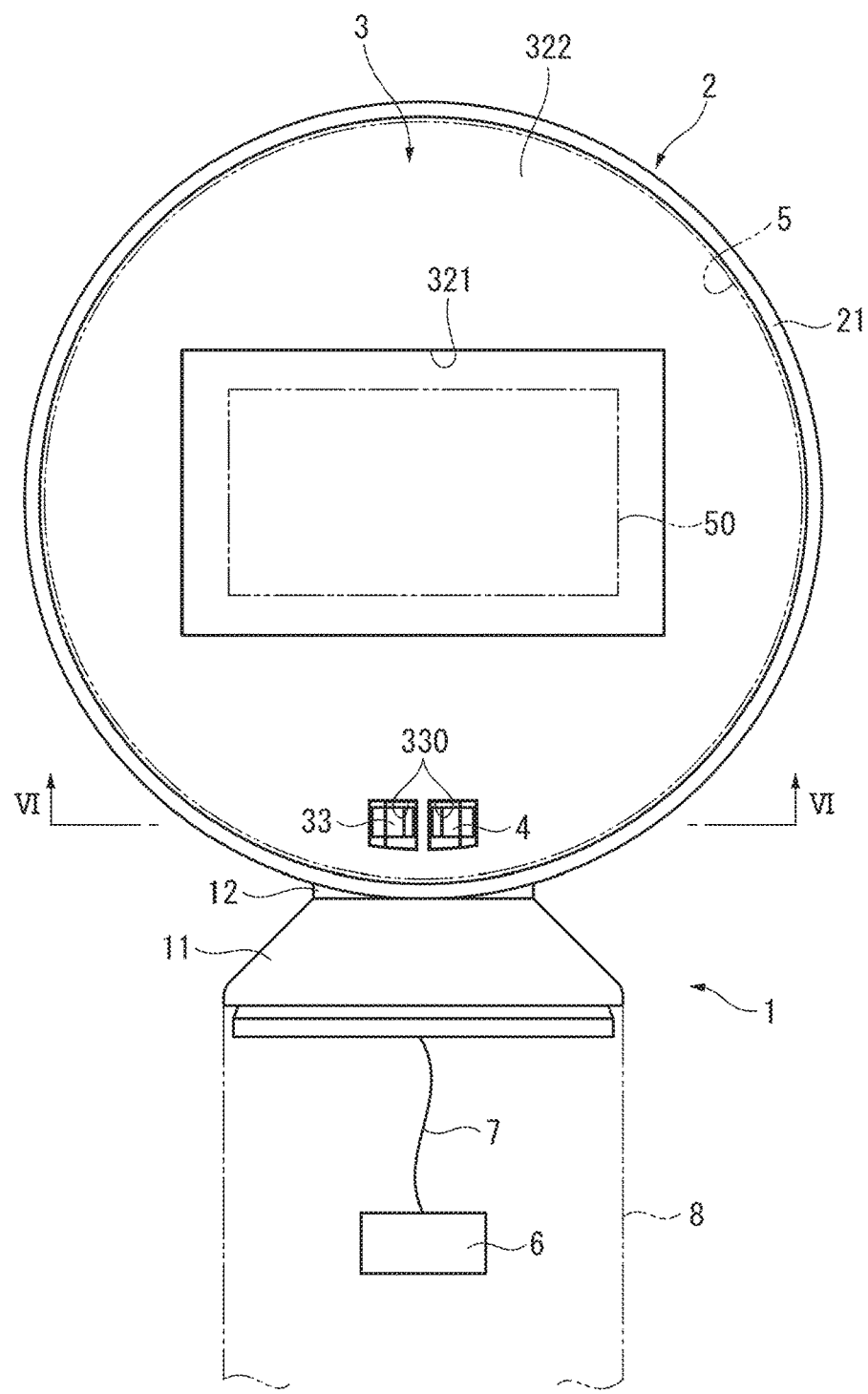
FIG. 1 is a front view showing an overall arrangement of a physical quantity measuring device according to an exemplary embodiment of the invention.
Figure 2:
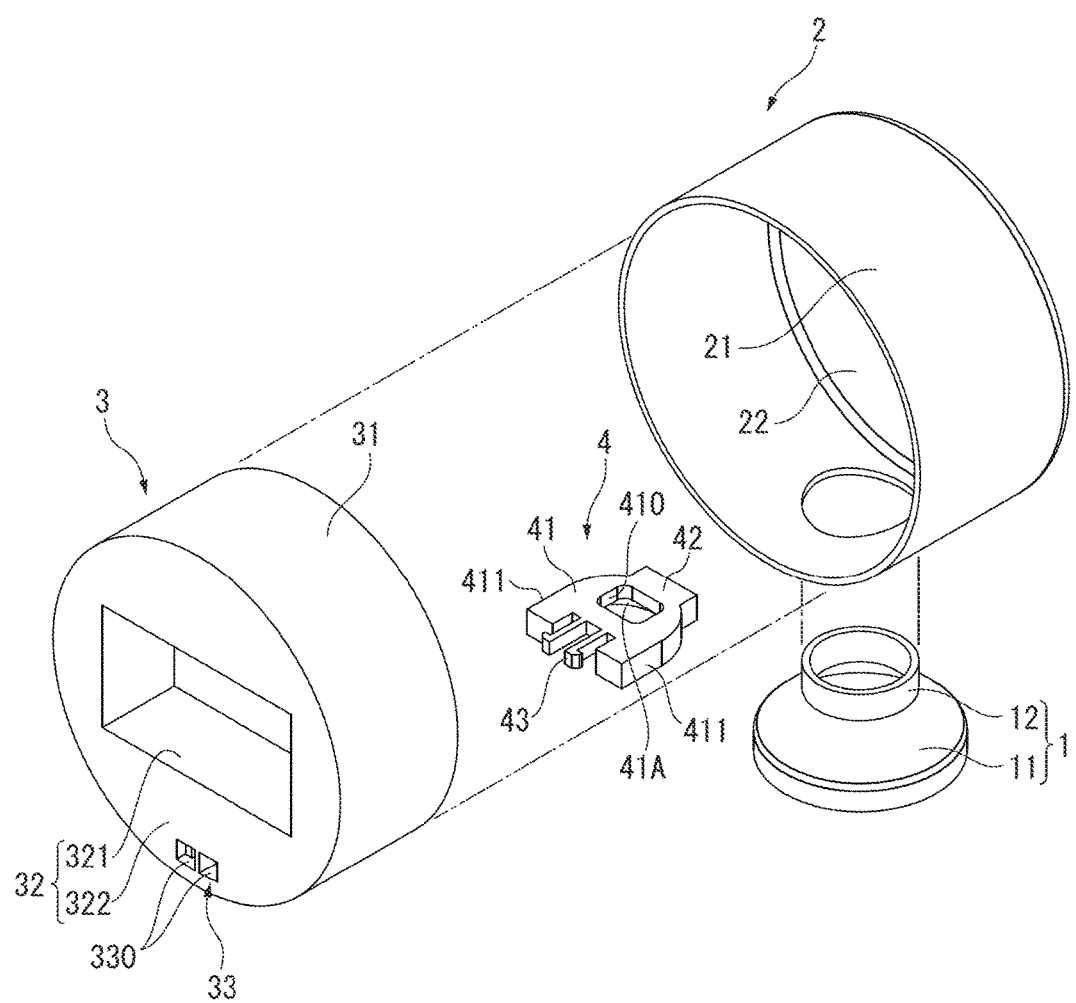
FIG. 2 is an exploded perspective view showing a relevant part of the physical quantity measuring device.
Figure 3:
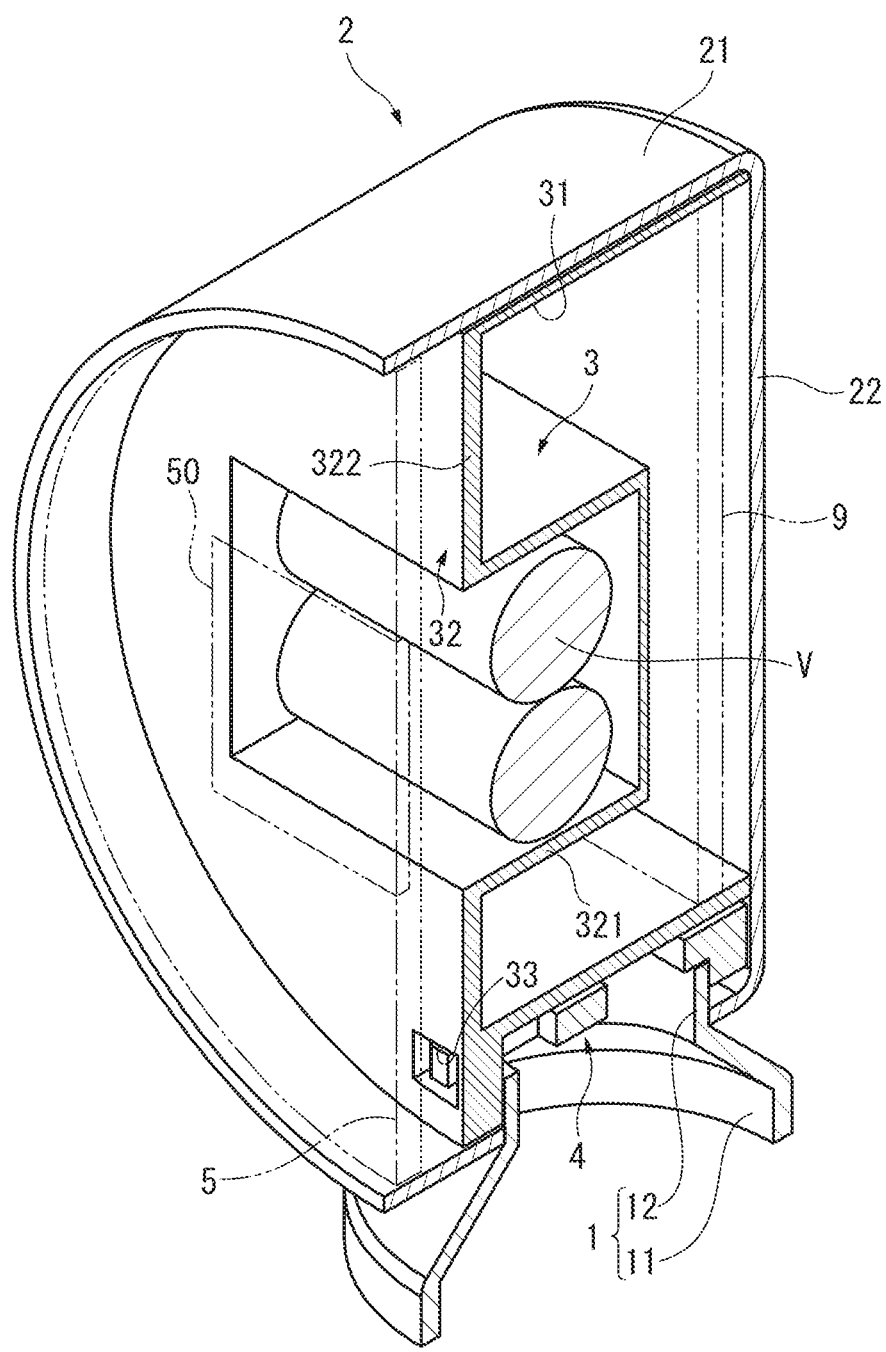
FIG. 3 is a partially broken perspective view showing the physical quantity measuring device.

FIGS. 1 to 3 show an overall arrangement of the physical quantity measuring device. FIG. 1 is a front view showing the physical quantity measuring device. FIG. 2 is an exploded perspective view showing a relevant part of the physical quantity measuring device. FIG. 3 is a partially broken perspective view showing the physical quantity measuring device.

As shown in FIGS. 1 to 3, the physical quantity measuring device includes a base 1, an outer case 2 placed on the base 1, an inner case 3 housed in the outer case 2, a fastener 4 configured to prevent detachment of the inner case 3 from the outer case 2, a display plate 5 placed at the front of the outer case 2, and a sensor 6 provided to the base 1.

The base 1, which is made of stainless steel, includes a conical portion 11 and a cylindrical portion 12 placed on a distal end of the conical portion 11.

The outer case 2, which is made of metal such as stainless steel, includes a cylinder 21 and a bottom 22 closing one of the openings of the cylinder 21 at one side.

The cylindrical portion 12 of the base 1, which has a distal end penetrating a part of the cylinder 21, is brazed to the cylinder 21.

The inner case 3, which is made of a synthetic resin, includes a cylinder 31 with an outer circumference facing an inner circumference of the cylinder 21 of the outer case 2, a front portion 32 integrally provided to the front of the cylinder 31, and a case-side engaging portion 33 integrally provided to the cylinder 31 and the front portion 32 at the lower side thereof.

The front portion 32 includes at the front center thereof a battery housing 321 for housing a battery placed and a surrounding portion 322 integral with the battery housing 321. The battery housing 321 is formed of a recess with respect to the surrounding portion 322 and a battery V is housed in the recess.

The surrounding portion 322 has an outer peripheral edge integral with the cylinder 31.

Figure 4A:
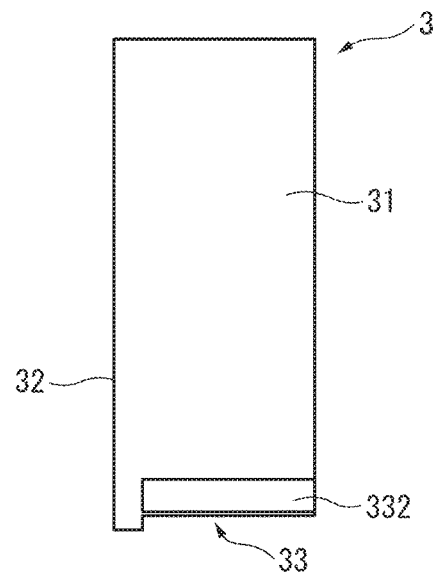
FIG. 4A is a side view of an inner case.
Figure 4B:
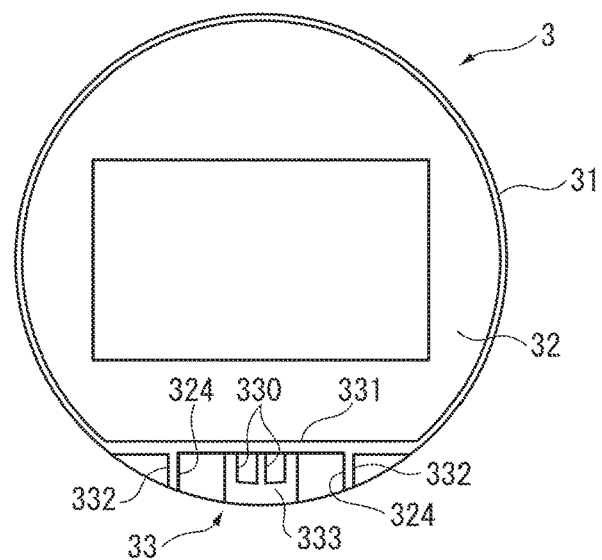
FIG. 4B is a rear view of the inner case.
Figure 4C:
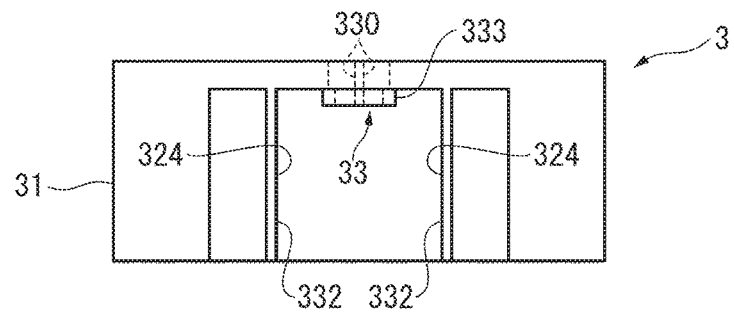
FIG. 4C is a bottom view of the inner case.

FIGS. 4A to 4C show an overall arrangement of the inner case 3. FIG. 4A is a side view showing the inner case 3. FIG. 4B is a rear view showing the inner case 3. FIG. 4C is a bottom view showing the inner case 3.

As shown in FIGS. 4A to 4C, the case-side engaging portion 33 includes a plate 331, a rib 332 provided to a bottom surface of the plate 331, and a projection 333 provided to the front portion 32 at the lower side thereof and projecting rearward.

The rib 332 includes two ribs opposite to each other. Opposite inward surfaces of the ribs 332 define a guide 324 for guiding the fastener 4.

The projection 333 is provided at the center thereof with two engagement holes 330. Each of the engagement holes 330 includes a narrow part 330A and a wide part 330B (see FIG. 5).

Figure 5:
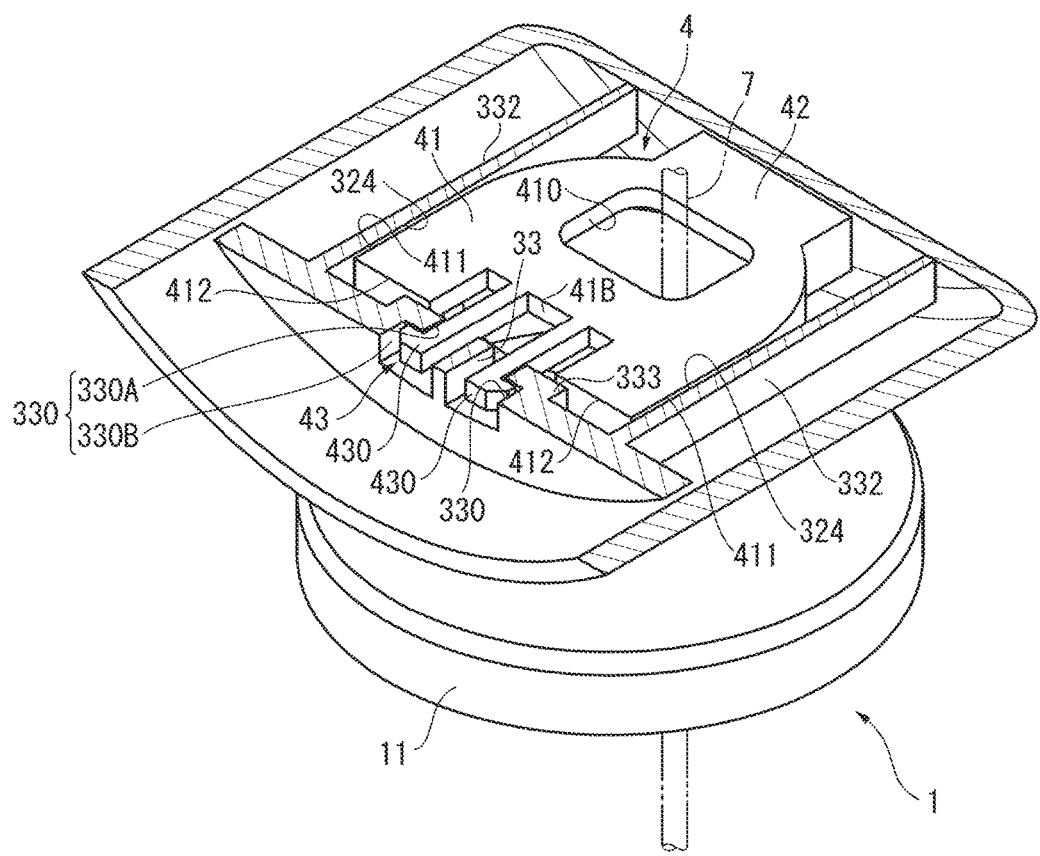
FIG. 5 is a perspective view showing a relevant part of the physical quantity measuring device.
Figure 6:
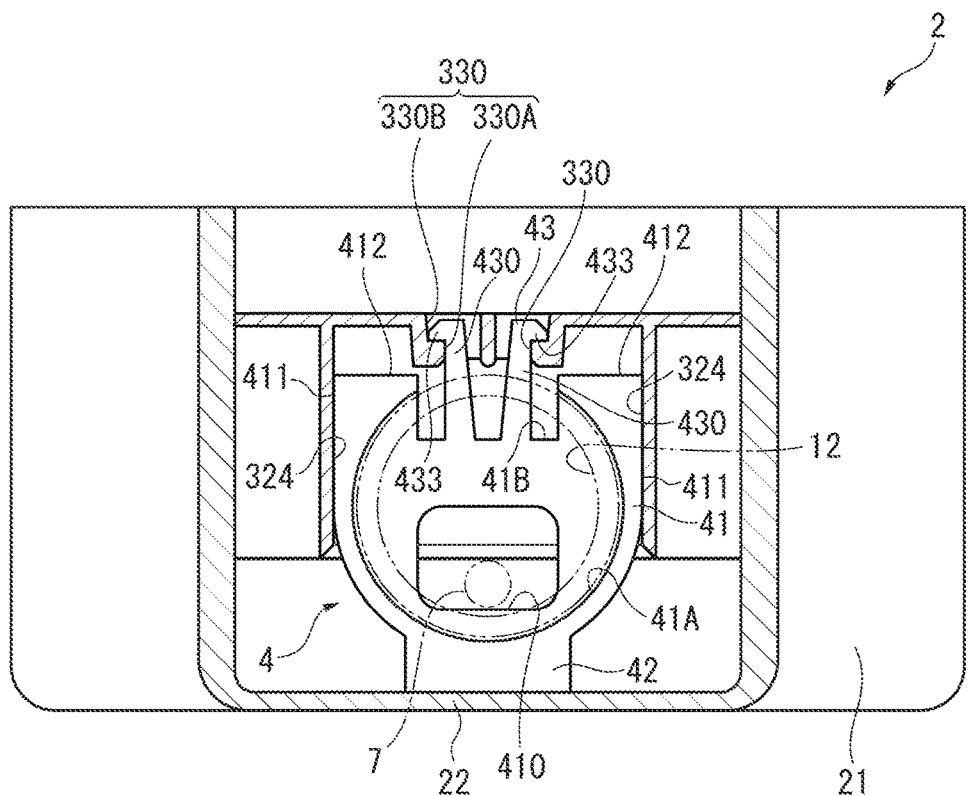
FIG. 6 is a sectional view taken along lines VI-VI in FIG. 1.
Figure 7A:
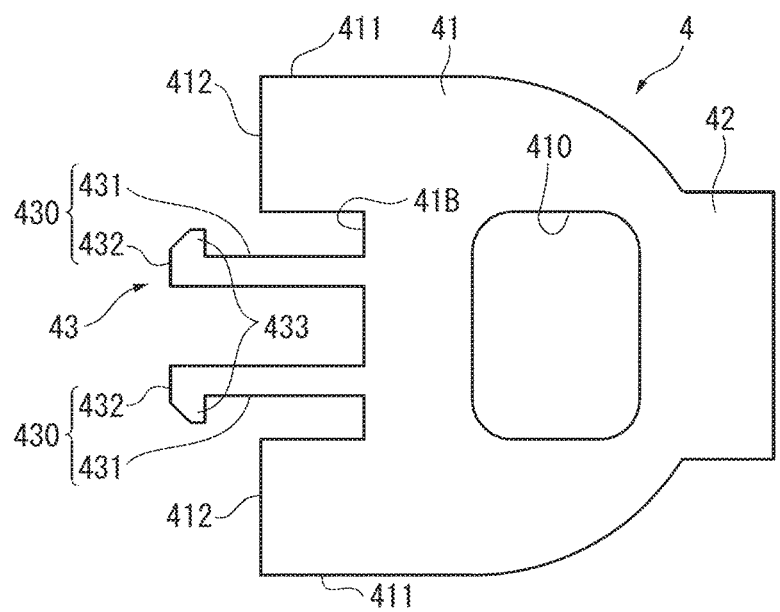
FIG. 7A is a plan view of a fastener.
Figure 7B:
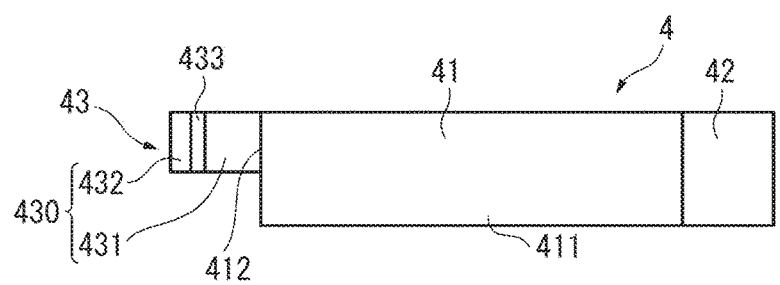
FIG. 7B is a side view of the fastener.
Figure 7C:
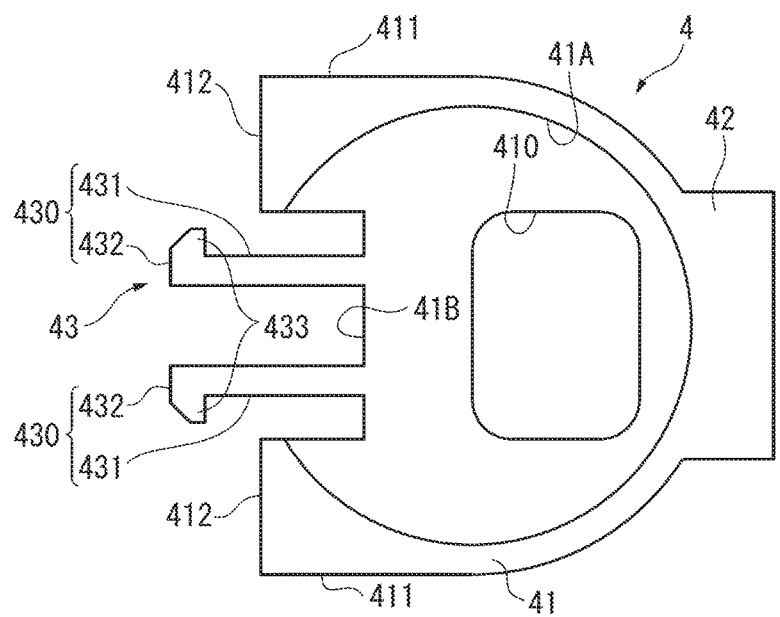
FIG. 7C is a bottom view of the fastener.

FIGS. 5 to 7C show a structure of the fastener 4 in detail. FIGS. 5 and 6 show the fastener 4 engaged with the inner case 3. FIG. 7A is a plan view of the fastener 4. FIG. 7B is a side view of the fastener 4. FIG. 7C is a bottom view of the fastener 4.

As shown in FIGS. 5 to 7C, the fastener 4, which is made of a synthetic resin, includes a plate-shaped body 41 configured to receive projection of the distal end of the cylindrical portion 12, a contact peripheral portion 42 integral with a peripheral edge of the body 41 at a first side, a fastener-side engaging portion 43 integral with a peripheral edge of the body 41 at a second side opposite to the first side.

The body 41 is provided with a hole 410, which is rectangular in a plan view, configured to receive a cable 7 (described later) therein. The body 41 has a bottom surface provided with an arcuate fitting groove 41A in which the distal end of the cylindrical portion 12 of the base 1 is to be fitted. The hole 410 is placed inside relative to the fitting groove 41A.

The body 41 has opposite side surfaces serving as an exterior 411 configured to be guided by the guide 324.

An end surface of the body 41 at the second side where the fastener-side engaging portion 43 exists is provided with a contact portion 412. A part of the contact portion 412 faces the projection 333 of the inner case 3.

The contact peripheral portion 42, which is configured to prevent the inner case 3 to rotate relative to the outer case 2, extends straight to be in contact with the bottom 22 of the outer case 2 over a predetermined length.

The fastener-side engaging portion 43, which projects in a direction away from a rectangular cut 41B of the body 41 and the contact peripheral portion 42, includes claws 430 individually engageable with the two engagement holes 330 of the inner case 3. The claws 430 each include a base end 431 and a distal end 432 integral with the base end 431. The distal end 432 includes a hook 433 for preventing detachment of each of the claws 430 from the engagement hole 330. The hook 433 is configured to be caught on a boundary portion between the narrow part 330A and the wide part 330B of the engagement hole 330. The hook 433 has a tapered distal end. Thus, when the two claws 430 are each received into the engagement hole 330, the tapered distal end of the hook 433 is guided by an opening edge of the narrow part 330A to be elastically deformed such that the two claws 430 approach each other. When the hook 433 reaches the wide part 330B, the elastic force of each of the claws 430 makes the hook 433 to move away from the other one.

Referring again to FIGS. 1 to 3, the sensor 6 is attached to an end of the conical portion 11 of the base 1 via a sensor attachment 8.

The display plate 5, which is of a disc shape, includes a display 50 placed at the center thereof. The display 50 is configured to digitally display a detection value detected by the sensor 6.

The sensor 6, which is a pressure sensor designed to detect pressure as a physical quantity, is connected to a first end of the cable 7.

The cable 7 extends through the inside of the base 1, the hole 410 of the fastener 4 and the inside of the inner case 3 to be connected at a second end thereof to a circuit board 9. The circuit board 9 is placed between the battery housing 321 of the inner case 3 and the bottom 22 of the outer case 2 (see FIG. 3).

The circuit board 9 is electrically connected to the battery V housed in the inner case 3. The circuit board 9 is also electrically connected to the display 50. A signal outputted from the sensor 6 is thus transmitted to the circuit board 9 through the cable 7, processed by the circuit board 9 and displayed as a pressure value by the display 50.

A glass window (not shown) is provided to the outer case 2 in front of the display plate 5.

To assemble the physical quantity measuring device, the distal end of the cylindrical portion 12 of the base 1 is first thrust through the cylinder 21 of the outer case 2 and the cylindrical portion 12 is brazed to the cylinder 21. Subsequently, the fastener 4 is mounted onto the distal end of the cylindrical portion 12 with the contact peripheral portion 42 facing the bottom 22 of the outer case 2. When the fastener 4 is mounted on the distal end of the cylindrical portion 12, the distal end of the cylindrical portion 12 is fitted in the fitting groove 41A of the fastener 4.

The first end of the cable 7 is connected to the sensor 6 having been attached to the base 1. The second end of the cable 7 is taken out through the hole 410 of the fastener 4 and connected to the circuit board 9. Further, the circuit board 9 is set in the vicinity of the bottom 22 of the outer case 2.

The inner case 3 is pressed against the fastener 4 with the exterior 411 of the fastener 4 being guided by the guide 324. This allows the fastener-side engaging portion 43 of the fastener 4 to be engaged with the engagement holes 330 of the projection 333 of the inner case 3.

It should be noted that when the inner case 3 is likely to be excessively pressed against the fastener 4 due to an axial dimension of the cylinder 31 of the inner case 3 shorter than a predetermined value, the projection 333, which is brought into contact with the contact portion 412 of the fastener 4, can prevent the inner case 3 from being excessively pressed.

Further, the display plate 5 is attached to the outer case 2 after the display 50 is electrically connected to the circuit board 9.

The above-described exemplary embodiment provides the following advantages.

(1) The fastener 4 includes the exterior 411 configured to be guided by the guide 324 of the inner case 3, the fastener-side engaging portion 43 engageable with the inner case 3, and the contact peripheral portion 42 configured to be contact with the outer case 2 to prevent the inner case 3 from rotating relative to the outer case 2. Fixation of the inner case 3 to the outer case 2 and prevention of the rotation of the inner case 3 relative to the outer case 2 can thus be achieved simply by mounting the fastener 4 on the base 1 and pressing the inner case 3 against the fastener 4.

(2) The fastener 4 is provided with the fitting groove 41A in which the distal end of the cylindrical portion 12 of the base 1 is to be fitted. The fastener 4 can thus be easily positioned relative to the base 1 immediately when the fastener 4 is mounted on the cylindrical portion 12 of the base 1. Since the distal end of the cylindrical portion 12 is fitted in the fitting groove 41A, the fastener 4 is unlikely to come off the base 1. The inner case 3 is thus reliably prevented from rotating relative to the outer case 2

(3) The inner case 3 and the fastener 4 are each made of a synthetic resin. The inner case 3 and the fastener 4 can thus be easily manufactured by injection molding or any other technique. The inner case 3, which is made of a synthetic resin, can also be easily provided with a relatively large hollow space as a battery housing space or the like. Further, the outer case 2 is made of metal. This facilitates exterior cleaning of the physical quantity measuring device, which is sanitarily favorable.

(4) The fastener 4 includes the body 41, the contact peripheral portion 42 of the body 41 designed to face the bottom 22 of the outer case 2, and the fastener-side engaging portion 43 provided to the body 41 at the end opposite to the contact peripheral portion 42. This simplifies the structure for preventing the inner case 3 from rotating relative to the outer case 2.

(5) The sensor 6 is provided to the base 1, the display 50 is attached inside the outer case 2, and the fastener 4 is provided with the hole 410 configured to receive therein the cable 7 connecting the display 50 to the sensor 6. The hole 410 serves to prevent interference between the fastener 4 and the cable 7, which results in facilitating assembly of the physical quantity measuring device.

(6) The fastener-side engaging portion 43, which is engageable with the engagement holes 330 of the inner case 3, has the distal ends each provided with the hook 433 for preventing the detachment. The fastener-side engaging portion 43 can thus be reliably engaged with the engagement hole 330 of the inner case 3, thereby preventing the fastener 4 from coming off the inner case 3. Such a simple engagement of the fastener 4 with the inner case 3 serves to prevent disassembly of a major part of the physical quantity measuring device.

(7) The two hooks 433 for preventing the detachment are reliably effective in preventing the detachment.

(8) The case-side engaging portion 33 includes the plate 331 provided to the cylinder 31 and the ribs 332 provided to the bottom surface of the plate 331. The case-side engaging portion 33 is thus enhanced in strength.

Incidentally, it should be understood that the scope of the present invention is not limited to the above-described exemplary embodiment(s) but includes modifications and improvements as long as the modifications and improvements are compatible with the invention.

For instance, although the exemplary embodiment uses the two hooks 433 for preventing the detachment, a single or three or more hooks may be used without departing from the scope of the invention.

Further, although the exemplary embodiment uses the fitting groove 41A provided to the fastener 4 and configured to be fitted with the cylindrical portion 12 of the base 1, any specific arrangement of the fastener 4 is not requisite to the invention as long as the fastener 4 can be fitted on the cylindrical portion 12. For instance, the fastener 4 may be provided with a cylindrical projection configured to be fitted on an inner circumference of the cylindrical portion 12.

Additionally, the battery housing at the front side of the inner case 3 is not requisite.

Although the physical quantity measuring device of the exemplary embodiment includes the sensor 6 configured to detect pressure, the physical quantity measuring device may include a sensor configured to detect any physical quantity different from pressure, such as differential pressure and temperature, without departing from the scope of the invention.

What is claimed is:

1. A physical quantity measuring device comprising:
   an outer case comprising a cylinder;
   a cylindrical inner case housed in the outer case;
   a cylindrical base having a distal end that penetrates through a circumferential surface of the cylinder of the outer case to be fixed to the outer case;
   a sensor provided to the cylindrical base and configured to detect a physical quantity and output a detection signal representing the physical quantity; and
   a fastener configured to be mounted on the distal end of the base to prevent detachment of the inner case from the outer case, the fastener comprising:
   an exterior configured to be guided by a guide provided to the inner case;
   a fastener-side engaging portion engageable with the inner case; and
   a contact peripheral portion configured to be in contact with the outer case to prevent the inner case from rotating relative to the outer case.

2. The physical quantity measuring device according to claim 1, wherein the fastener further comprises a fitting groove in which the distal end of the base is to be fitted.

3. The physical quantity measuring device according to claim 1, wherein
   the outer case is made of metal, and
   the inner case and the fastener are each made of a synthetic resin.

4. The physical quantity measuring device according to claim 1, wherein
   the outer case comprises a bottom provided to the cylinder,
   the contact peripheral portion is brought into contact with the bottom of the outer case, and
   the fastener-side engaging portion is placed opposite the contact peripheral portion.

5. The physical quantity measuring device according to claim 1, wherein
   a circuit board configured to receive and process the detection signal outputted by the sensor through a cable and a display configured to display the detection signal processed by the circuit board are attached inside the outer case, and
   the fastener is provided with a hole configured to receive therein the cable.

6. The physical quantity measuring device according to claim 1, wherein the fastener-side engaging portion comprises a claw engageable with an engagement hole provided to the inner case, the claw having a distal end provided with a hook for preventing detachment.

* * * * *